(12) United States Patent  (10) Patent No.: US 9,201,519 B2
Cheng et al.  (45) Date of Patent: Dec. 1, 2015

(54) THREE-DIMENSIONAL POINTING USING ONE CAMERA AND THREE ALIGNED LIGHTS

(71) Applicant: AMCHAEL VISUAL TECHNOLOGY CORPORATION, Hsinchu (TW)

(72) Inventors: Kai Michael Cheng, Hsinchu (TW); Yushiuan Tsai, Guishan Township (TW); Hsien-Cheng Lu, Zhongli (TW)

(73) Assignee: AMCHAEL VISUAL TECHNOLOGY CORPORATION, Hsinchu (TW)

( * ) Notice: Subject to any disclaimer, the term of this patent is extended or adjusted under 35 U.S.C. 154(b) by 0 days.

(21) Appl. No.: 14/104,331

(22) Filed: Dec. 12, 2013

(65) Prior Publication Data

US 2015/0049021 A1  Feb. 19, 2015

Related U.S. Application Data

(60) Provisional application No. 61/865,630, filed on Aug. 14, 2013.

(51) Int. Cl.
*G06F 3/0354*  (2013.01)

(52) U.S. Cl.
CPC .................................. *G06F 3/03543* (2013.01)

(58) Field of Classification Search
CPC combination set(s) only.
See application file for complete search history.

(56) References Cited

U.S. PATENT DOCUMENTS

| 5,532,777 | A | 7/1996 | Zanen |
|---|---|---|---|
| 5,909,209 | A | 6/1999 | Dickinson |
| 6,057,540 | A | 5/2000 | Gordon et al. |
| 6,072,496 | A * | 6/2000 | Guenter et al. ............... 345/419 |
| 6,525,306 | B1 | 2/2003 | Bohn |
| 6,643,396 | B1 | 11/2003 | Hendriks et al. |
| 7,274,800 | B2 | 9/2007 | Nefian et al. |
| 7,849,421 | B2 | 12/2010 | Yoo et al. |
| 8,269,721 | B2 | 9/2012 | Lin |

(Continued)

FOREIGN PATENT DOCUMENTS

EP  2226707 B1  1/2013

OTHER PUBLICATIONS

Pranav Mistry; Mouseless, the 'invisible' computer mouse (w/Video); Phys.org; Jul. 8, 2010; 2 pages; http://phys.org/news197792915.html.

(Continued)

*Primary Examiner* — Van Chow
(74) *Attorney, Agent, or Firm* — King & Schickli, PLLC (57) ABSTRACT

Methods and systems for surface-free pointing and/or command input include a computing device operably linked to an imaging device. The imaging device can be any suitable video recording device including a conventional webcam. At least one pointing/input device is provided including first and second sets of visible point light sources, wherein the first and second sets emit differently colored light. The imaging device captures one or more sequential image frames each including a view of a scene including the first and second sets of visible point light sources. One or more software programs calculate a position and/or a motion and/or an orientation of the pointing/input device in the captured image frames by identifying colored areas corresponding to the first set of aligned visible point light sources. Certain activation patterns of individual point light sources are mapped to particular pointing and/or input commands.

12 Claims, 6 Drawing Sheets

(56) References Cited

U.S. PATENT DOCUMENTS

| | | |
|---|---|---|
| 8,467,612 B2 * | 6/2013 | Susca et al. .............. 382/202 |
| 2009/0315825 A1 | 12/2009 | Cauchi |
| 2010/0017115 A1 | 1/2010 | Gautama |
| 2011/0169734 A1 | 7/2011 | Cho et al. |
| 2011/0310230 A1 | 12/2011 | Cheng |
| 2015/0022449 A1 * | 1/2015 | Cheng et al. .............. 345/163 |

OTHER PUBLICATIONS

Pranav Mistry and Pattie Maes; "Mouseless"; MIT Media Laboratory, Oct. 2010, pp. 441-442.

"Mouse (computing"; Wikipedia; Sep. 25, 2013; 8 pages; http://en.wikipedia.org/wiki/Mouse_(computing).

Freanz Madritsch; "CCD-Camera Based Optical Tracking for Human-Computer Interaction"; Proceedings 1st European Conference on Disability, Virtual Reality and Associated Technologies, Maidenhead; pp. 161-170 (1996).

Richard Hartley, et al.; "Triangulation"; Computer Vision and Image Understanding, vol. 68, No. 2, pp. 146-157 (1997); Article No. IV970547.

Philips; "uWand technology"; How uWand Works—Intuitive3 Remotes for SmartTV; 1 page printed on Sep. 16, 2014; http://www.uwand.com/how-uwand-works.html.

Wii from Wikipedia; 33 pages printed on Sep. 16, 2014; http://en.wikipedia.org/wiki/Wii.

U.S. Appl. No. 14/089,881, filed Nov. 26, 2013 entitled Algorithms, Software and an Interaction System That Support the Operation of an on the Fly Mouse.

* cited by examiner

THREE-DIMENSIONAL POINTING USING ONE CAMERA AND THREE ALIGNED LIGHTS

This utility patent application claims the benefit of priority in U.S. Provisional Patent Application Ser. No. 61/865,630 filed on Aug. 14, 2013, the entirety of the disclosure of which is incorporated herein by reference.

TECHNICAL FIELD

The present disclosure relates to human-computer interaction systems. More specifically, this disclosure pertains to methods and systems for use of a conventional video recorder such as a webcam for two-dimensional (2D) and three-dimensional (3D) pointing and command inputs in a computing system relying on passive light detection for both 2D and 3D modes. Embodiments of a pointing/input device for use in the methods and systems are disclosed.

BACKGROUND OF THE INVENTION

The operation of a conventional mechanical or optical pointing or input device such as a mechanical or optical computer mouse is well known in the art. By use of these devices, the user can select files, programs, or actions from lists, groups of icons, etc., and can "gesturally" move files, programs, etc. issue commands or map to specific actions, for example in drawing programs.

As examples, a mechanical computer mouse relies on one or more wheels and/or balls to track movement or displacement information relative to forward-backward and left-to-right movement of the computer mouse, for example by interrupting infrared beams of light directed at light sensors to create pulses representative of wheel or ball movement. Simple logic circuits interpret the relative timing of the pulses to indicate which direction the wheel(s) or ball(s) is moving, which is then converted by driver software into motion of a visual indicator such as a pointer, cursor, or cross-hair along X and Y axes of a computing device display screen.

An optical computer mouse replaces the mechanical mouse wheels or balls with one or more visible or invisible light sources such as light-emitting diodes (LEDs), laser diodes, infra-red light, etc. to detect movement of the mouse relative to an underlying surface such as a mouse pad. The inertial/gyroscopic computer mouse uses a tuning fork or other accelerometer to detect rotary movement for every axis supported, most commonly using 2 degrees of rotational freedom and being insensitive to spatial translation. The user need only perform small wrist rotations to move a pointer or cursor on a display screen.

Figure 1:
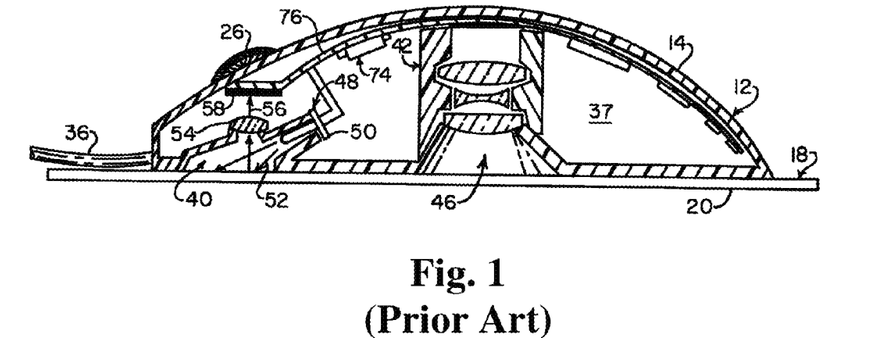
FIG. 1 shows a side view of a prior art optoelectronic mouse including an integrated digital camera.

Almost all modern 2D pointing devices utilize an active approach for detecting movement of the device. The underlying technology of modern surface-independent (meaning that a specific surface type is not required, although some type of surface is) 2D pointing/input devices such as optical mice (see FIG. 1) is known as digital image correlation. The mouse includes a shell or housing and a variety of input means such as left and right buttons, a scroll wheel, etc. A displacement detection LED disposed on a bottom surface of the mouse is used to detect movement of the mouse over a surface. An optical or optoelectronic mouse uses an optoelectronic sensor (essentially, a tiny low-resolution video camera) to image a naturally occurring texture of an underlying surface made of materials such as wood, cloth, mouse pad materials and Formica, using light reflected from the surface. These surfaces, when lit at a grazing angle by the displacement detection LED, cast distinct shadows that resemble a hilly terrain lit at sunset. Images of these surfaces are captured in continuous succession as the mouse is translated over the surface, often at a speed of more than one thousand frames per second. Depending on the speed with which the mouse is moved, each image will be offset from the previous image by a fraction of a pixel or as many as several pixels. By using cross correlation to calculate how much each successive image is offset from the previous image, a displacement processor can determine the distance the mouse has moved from image data captured by the sensor. The movement of the mouse can then be translated or converted into a corresponding movement of a visible marker such as a cursor on a graphical user interface such as a computer screen.

Even though a special surface such as a mouse-pad is not needed by a modern optical mouse, a surface is still required for operation of the mouse. If a suitable operating surface is not available and an alternative such as a touchpad or trackball is also not available, a conventional optical mouse cannot be used. In turn, certain tasks often done with pointing/input devices such as a computer mouse are difficult to impossible to accomplish with alternative pointing/input devices such as touchpads or trackballs. For example, use of drawing programs without a computer mouse can be difficult if not impossible. Likewise, tasks such as two-dimensional (2D) or 3D sculpturing or drawing, "flying" in multi-dimensional space (for example, three-dimensional space defined by X, Y, and Z axes) such as during gaming, etc. would be difficult to accomplish using a conventional touchpad, trackball, etc. Still more, personal computers (PCs) are not merely tools for surfing the internet and sending e-mail in the modern world. Increasingly, PCs serve as digital media centers to view photos, listen to music, and watch video clips, films and TV shows. Indeed, notebook, laptop, and desktop computers are rapidly replacing the home entertainment centers.

Likewise, the modern television is no longer just a TV, offering integrated Internet capabilities and set-top boxes that offer more advanced computing ability and connectivity than a contemporary basic TV set. The modern "smart" TV can deliver content from computers or network attached storage devices, such as photos, movies and music. These devices also provide access to Internet-based services including traditional broadcast TV channels, pre-recorded programs, video-on-demand, electronic program guides, interactive advertising, personalization, voting, games, social networking, and other multimedia applications. All of these require a remote control-like device that can provide cursor control, i.e. a pointing/input device as is known for computing devices. Unfortunately, traditional television remote controls cannot conveniently provide such functionality. As noted above, a conventional pointing/input device such as a computer mouse requires a desk or other hard surface to function.

For this reason, attempts have been made to adapt the familiar computer mouse to operate in the air or "on the fly," to avoid the need for a surface over which to translate the mouse for operation. Indeed, 3D pointing has long been a desired feature in human-computer interaction to allow tasks that are not possible with a 2D pointing device, such as 3D sculpturing or space navigating. However, 3D pointing technology has not reached a stage that is considered both reasonably affordable and manipulative.

For 3D pointing, it is necessary to identify the location of the pointing device with respect to a reference point in a 3D space. Unlike 2D pointing which mainly uses an active approach, 3D pointing has been attempted using both active and passive approaches. The approach taken depends on whether the pointing device includes a displacement detection system that works in 3D space. The optical displacement detection system of an optical mouse can only work on a surface due to the operating mechanism summarized above; it cannot work if suspended in 3D space.

In the active approach, typically an imager such as an IR camera is integrated into the pointing device to detect lights from an IR emitter of a console such as the console of a gaming device, and calculate spatial coordinates for the pointing device accordingly. The Wii® Remote marketed by Nintendo® falls within that category. A problem with this approach is that the pointing device spatial coordinates can only be calculated when its imager has a direct line of sight to a sensor bar associated with the gaming device console.

Another active type of 3D mouse uses a tuning fork or other accelerometer to detect rotary movement for every axis supported. Logitech® and Gyration's inertial mice (also called gyroscopic mice) fall in this category. The most common models work using 2 degrees of rotational freedom. An operator uses wrist rotations to move the cursor. The inertial mouse is insensitive to spatial translations. More recently, an inertial mouse was developed, equipped with g-sensors (pairs of accelerometers extended over a region of space) to calculate the mouse position, orientation and velocity; hence such a mouse can provide at least 9 spatial parameters for pointing purposes. However, the price of such an inertial mouse is quite high; usually 10 times more than the price of a typical optical mouse.

For pointing devices that do not include a distance measuring component, a passive approach has been evaluated requiring a separate component to measure the distance between the pointing device and, for example, a gaming device or base station, or to identify the location of the pointing device with respect to the gaming device or base station. All gesture-based pointing device approaches, such as the Kinect® device marketed by Microsoft®, belong to this latter category. In this case, the fingers or the hands of a user play the role of a pointing device and a special imaging device is required to identify the locations of the fingers or hands of the user. Three-dimensional mice such as 3Dconnexion/Logitech's® SpaceMouse® in the early 1990s and Kantek's® 3D RingMouse® in the late 1990s, also known as bats, flying mice or wands, also fall in this category. As an example, the RingMouse® was tracked by a base station through ultrasound. This approach has been found to provide insufficient resolution.

Still other attempts have been made to implement passive detection of a pointing device location by combining pointing and imaging functionalities in a single device. In one such device, a digital camera mounted into the housing of a computer mouse includes a mode selection system to switch the device between a 2D mouse function and a digital camera function (see FIG. 1). The device could not be used for 3D pointing. In another attempt, three one-dimensional imaging devices were used to track a point light source, to recognize and execute gestures input by the operator. The problem with this approach is that a holding time is required before each operation such as a click or drag can be performed.

To date, the present inventors are unaware of any attempts to use a single-lens imaging device to capture the motion and clicking activities of an "on the fly" pointing device for 2D and 3D pointing in a 3D human-computer interaction system.

SUMMARY OF THE INVENTION

To solve the foregoing problems and address the identified need in the art, the present disclosure provides a human-computer interaction system supporting 2D and 3D pointing in "air mode." In the following, for easy reference the term "air mode" refers to the operation of a pointing/input device in the air, i.e. 3D space, and the term "surface mode" refers to the operation of a pointing/input device on a surface such as a desk. The system uses a single lens imaging device and software to process light emitted from a pointing/input device and to determine therefrom a position and/or angle of the pointing/input device. Systems and methods incorporating these devices are provided. In particular, the present disclosure provides systems and methods via which such "air mode" pointing and command input can be achieved using substantially conventional single lens imaging devices such as standard webcams.

In one aspect, a human-computer interface system is provided including at least one pointing/input device and an imaging device operably connected to a computing device. A pointing/input device is provided which lacks an internal displacement detection system. Instead, the pointing/input device includes two sets of actuable visible point light sources, with each set emitting light having a wavelength defining a predetermined color. The individual point light sources of a set of point light sources are typically aligned with one another. The predetermined color of the first visible point light source set is different from the predetermined color of the second visible point light source set.

The at least one pointing/input device is held or moved in a three-dimensional space disposed within a field of view of the imaging device. The imaging device, which may be a conventional webcam, captures a plurality of sequential image frames each including a view of a position of the pointing/input device (determined by the actuated sets of visible point light sources) within the imaging device field of view. The two sets of aligned visible point light sources are differently actuated according to whether 2D pointing/input or 3D pointing/input are desired, or whether a specific command such as "drag and drop" is to be executed.

Then, from the captured plurality of sequential image frames, the different actuation of the sets of visible point light sources is interpreted by one or more computer program products as corresponding to a particular pointing, movement, or input command. A visual marker is then rendered on a graphical user interface, the visual marker being mapped to the particular pointing, movement, or input command.

One or more computer program products are provided including executable instructions for calculating a 2D or a 3D position and/or motion and/or orientation or angle of a pointing/input device in a captured image including a view of the pointing/input device, and mapping that position and/or orientation to a corresponding visual marker position in a graphical user interface. Likewise, particular combinations of activated point light sources of the pointing/input device can be mapped to particular pointing and/or input commands. Acquired sequential digital image frames are converted to digital data by an imaging device sensor, and analyzed to determine as needed a position, a depth, and an orientation/angle of particular sets of activated point light sources or individual activated point light source combinations on the pointing/input device. From this information, a visual marker such as a cursor is rendered on a graphical user interface, corresponding to a calculated 2D or 3D position and/or motion of the pointing/input device moved in three-dimensional space, and to various input commands of the pointing/input device.

In another aspect, methods are provided for executing pointing and/or input commands using differently actuated sets of aligned visible point light sources of a pointing/input device according to the present disclosure. Sequential images including a position and actuated visible point light source pattern are captured by an imaging device, typically a single lens imaging device such as a conventional webcam. The captured sequential images including a view of the pointing/input device are used to calculate a position, motion, and/or input command of the pointing/input device and to map that position, motion, and/or input command of the pointing/input device to a corresponding visual marker such as a cursor displayed in a graphical user interface. In this manner, 2D and 3D pointing and command input are made possible using only a single lens imaging device such as a webcam, and further using a pointing/input device that does not require translation over a surface as is the case with, e.g. a conventional optical mouse.

In yet another aspect, a pointing/input device is provided including first and second sets of aligned visible point light sources. The first set of aligned visible point light sources emits light in a wavelength defining a first predetermined color. The second set of visible point light sources emits light in a wavelength defining a second predetermined color that is different from the first predetermined color. Actuators are provided allowing differently actuating the two sets of visible point light sources and also individual point light sources within the two sets. The different light patterns emitted by differently actuating the two sets of visible point light sources and/or of individual point light sources are captured in sequential image frames and interpreted by one or more computer program products as motion, pointing, and/or command inputs of the pointing/input device.

These and other embodiments, aspects, advantages, and features of the present invention will be set forth in the description which follows, and in part will become apparent to those of ordinary skill in the art by reference to the following description of the invention and referenced drawings or by practice of the invention. The aspects, advantages, and features of the invention are realized and attained by means of the instrumentalities, procedures, and combinations particularly pointed out in the appended claims. Unless otherwise indicated, any patent and/or non-patent citations discussed herein are specifically incorporated by reference in their entirety into the present disclosure.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE INVENTION

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention. Also, it is to be understood that other embodiments may be utilized and that process, reagent, materials, software, and/or other changes may be made without departing from the scope of the present invention.

The present disclosure relates to a human-computer interaction system 10 that allows 2D and 3D pointing operations in air mode, i.e. without any requirement for translating a pointing device over a surface to measure a distance displacement thereof. The system 10 comprises a specialized pointing/input device 14, an imaging device 12, and at least one light tracking computer program. The imaging device 12 may be connected as a separate peripheral to a computing device 16 by wired means such as universal serial bus (USB) cables 17 (see FIG. 2), or by wireless means such as a USB receiver that receives a signal sent by a wireless imaging device 12 (not shown). Alternatively, the imaging device 12 may be provided as an embedded or integrated attachment to a computing device 16 (see FIG. 3). The computing device 16 includes a graphical user interface 18, such as a conventional 2D or 3D screen, and an input means such as a keyboard 20.

The imaging device 12 is typically a single lens imager such as a conventional webcam, although use of multi-view imaging devices is contemplated. The imaging device 12 includes a digital video recorder operatively coupled to an image sensor which encodes images for later decoding by the computing device 16. Any suitable video recorder which is or can be configured for use with computing devices 16 is contemplated, such as a conventional webcam or other recorder or recorder configuration for providing digital data representative of captured image frames showing a particular view. However, for each captured image frame typically only one view of a taken scene will be used in the light tracking process even if a multi-view imaging device is used in the imaging process. A number of suitable image sensors are known in the art and are contemplated for inclusion in the present system 10, including without limitation conventional charge-coupled device (CCD) or complementary metal oxide semiconductor (CMOS) technology. The resolution of the imaging device 12 will typically be at least VGA level, i.e., 640×480, although it may be higher.

Figure 2:
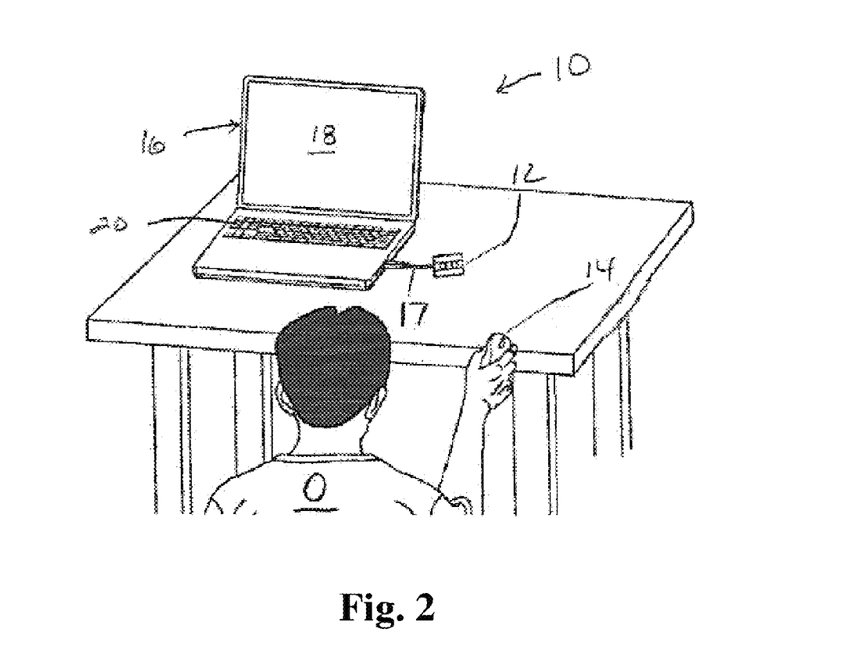
FIG. 2 depicts a human-computer interaction system according to the present disclosure using a stand-alone webcam as an imaging device.
Figure 3:
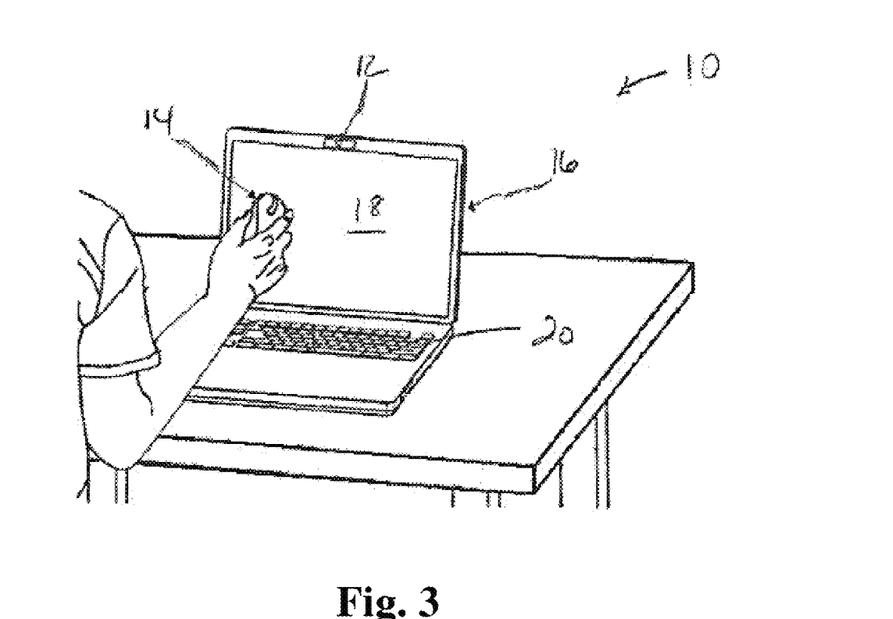
FIG. 3 depicts a human-computer interaction system according to the present disclosure using an embedded webcam as an imaging device.

In one exemplary embodiment, the imaging device 12 is installed as a component of or a peripheral to a keyboard of a computing device 16 such as a laptop or notebook computer (see FIGS. 2-3). Of course, the skilled artisan will appreciate that the system 10 can be integrated as a component of or provided as a peripheral for any known or to-be-developed computing device 16, including without limitation desktop or laptop computers, other portable computers, tablet computers, smartphones, personal digital assistants (PDAs), Web-enabled or so-called "smart" televisions, and the like.

In one embodiment (see FIGS. 4-5), the pointing/input device 14 resembles a conventional pointing device in its exterior configuration, including a housing 22, a right button 24. and a left button 26. The familiar scroll wheel is replaced by an actuator 28. In terms of its pointing/input functions, the pointing/input device 14 typically functions wirelessly as will be described in greater detail below. That is, the pointing/input device 14 is typically not directly operatively connected with the imaging device 12 or the computing device 16, i.e. is not "hard-wired" thereto nor specifically configured to send a specialized signal thereto. However, it will be appreciated that some use of wiring/cabling is contemplated. For example, a USB or other cable may connect the pointing/input device 14 to the computing device 16, to provide a power source for the operation of the pointing/input device 14. Alternatively, a power source such as one or more batteries may be internally included (see FIG. 6) in the pointing/input device 14.

Figure 4:
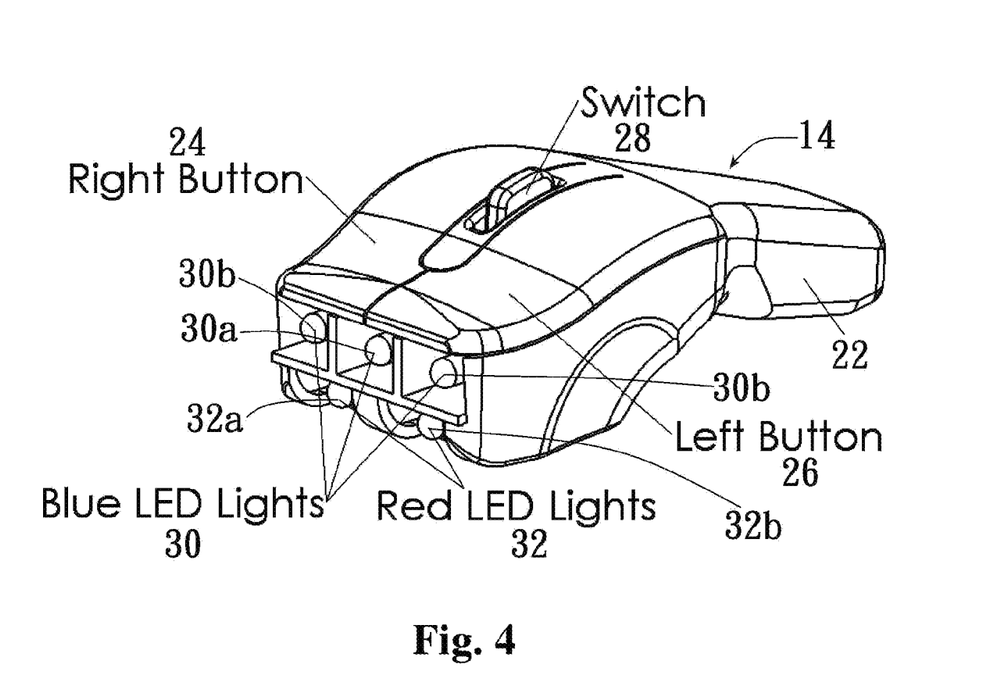
FIG. 4 shows a front perspective view of a pointing/input device according to the present disclosure.

The pointing/input device 14 includes a series of actuable point light sources which when actuated allow the system 10 to interpret various patterns of actuated point light sources or sets of point light sources as specific pointing or input commands. In an embodiment, a first set of aligned point light sources 30 and a second set of aligned point light sources 32 are provided on a surface of the pointing/input device 14. The individual point light sources of first and second sets 30, 32 are typically aligned one with another as shown in FIG. 4. The first set 30 emits light of a first predetermined color, and the second set 32 emits light of a second predetermined color that is different from the first predetermined color. Use of LED lights as the point light sources is contemplated, although it will be appreciated that LED lights are only one non-limiting example of potential structures serving as first and second point light source sets 30, 32, and that other suitable light sources are contemplated for use. In an embodiment, first point light source set 30 emits light of a blue color, and second point light source set 32 emits light of a red color, since the light wavelengths for red (450-495 nm) and blue (620-750 nm) are at nearly opposite ends of the visible light spectrum (380-750 nm) and so can readily be distinguished by the computer program products that will be discussed in greater detail below.

However, use of other colors is contemplated, and the skilled artisan can readily derive the corresponding wavelengths of the visible spectrum corresponding to alternative colors. For example, a green point light source set 30 could be provided when an RGB (red-green-blue) color model is used. In such an instance, image frames would be converted into an HSV (hue, saturation, and value) color model, i.e. a cylindrical-coordinate representation of the RGB color model, and an intensity of the new color in the image could be computed.

Figure 6:
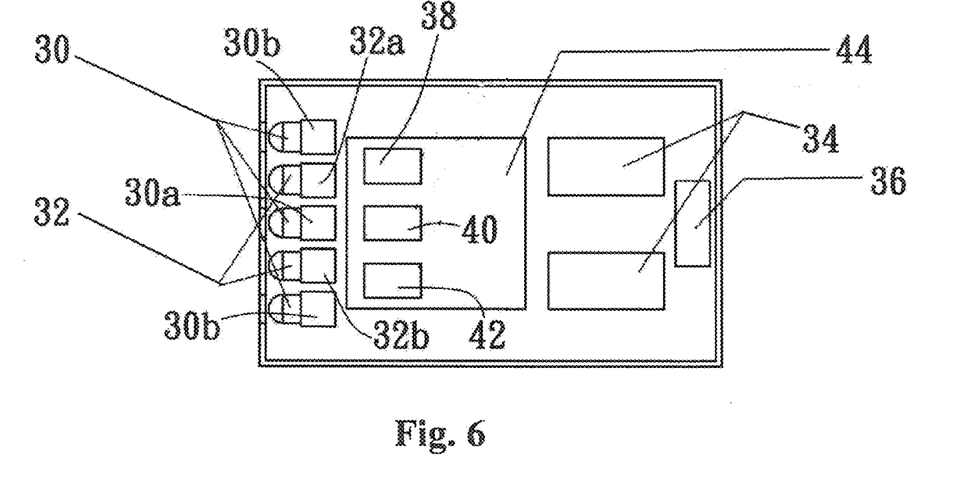
FIG. 6 depicts schematically a top view of a control mechanism for the pointing/input device of FIG. 4.

The pointing/input device 14 also includes various interior mechanisms, including batteries 34 (or an alternative power source as described above), main switch 36 and additional switches 38, 40, and 42, and various circuits (shown generally as control circuit 44) (see FIG. 6). The batteries 34 provide power to the first and second point light source sets 30, 32 via control circuit 44, and the switches 38, 40, and 42 variously control the power supply to the first and second point light source sets 30, 32. In an embodiment, main switch 36 provides overall control of operation of the pointing/input device 14. Switch 38 controls the power supply to the right point light source of second visible point light source 32 and switch 42 controls the power supply to the left point light source of second visible point light source 32. Switch 40 controls the power supply to the left and right point light sources of first visible point light source 30. Of course, this arrangement is merely representative, and alternative configurations of switches, point light sources, and circuits can readily be envisioned. The requirement is that the first and second set 30, 32 of visible point light sources and certain individual point light sources of the first and second set 30, 32 of visible point light sources may be differently controlled.

Figure 7:
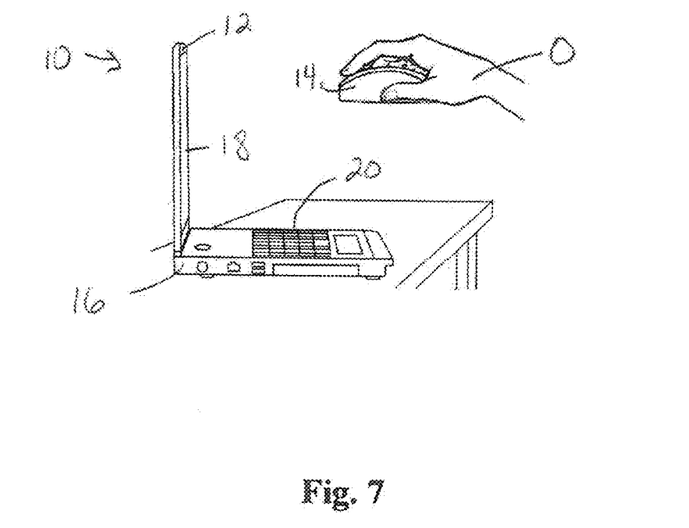
FIG. 7 shows a user holding the pointing/input device of FIG. 4 in a field of view of the imaging device of the human-computer interaction system of FIG. 3.

For purposes of the following examples, the point light sources of first set 30 will be referenced herein as blue LEDs 30a, 30b and the point light sources of second set 32 will be referred to as red LEDs 32a, 32b, and the various calculations and computations will be tied to use of red and blue point light sources as described. However, as discussed above alternate colors are contemplated and alternate types of point light sources may be easily adapted to the invention, and so are contemplated for use herein. As summarized above, the pointing/input device 14 is adapted for both 2D and 3D pointing. For 2D pointing mode, the operator activates the imaging device 12 and then activates the pointing/input device 14 using main switch 36. This actuates a middle blue LED 30a. The operator O then holds the pointing/input device 14 in his/her hand with the front side of the device facing and within a vertical and horizontal field of view of the imaging device 12, as shown in FIG. 7.

The operator O moves the screen cursor (not shown) around by moving the pointing/input device 14 around in 3D space, and conveniently performs clicking or dragging operations by pushing/holding the corresponding buttons 24, 26 the same as for an ordinary computer mouse. The operator O can move the pointing/input device 14 in any direction as long as the first and second point light source sets 30, 32 of the pointing/input device 14 are facing the imaging device 12 and the pointing/input device 14 is within the horizontal and vertical fields of view of the imaging device 12. When the operator moves the pointing/input device 14 in the air, the images taken by the imaging device 12 will be processed by one or more computer program products to determine a 2D location of the middle LED 30a. That information is then used to determine the location of a cursor (not shown) on graphical user interface 18.

Computer program product(s) and calculations for performing this tracking job for 2D pointing are described in detail in the present assignee's co-pending U.S. utility patent application Ser. No. 14/089,881 for "Algorithms, software, and an interaction system that support the operation of an on the fly mouse," the entirety of which is incorporated herein by reference. Briefly, one or more computer program products include executable instructions for calculating a position of activated middle LED 30a in a captured image including a view of the pointing/input device 14, and mapping that middle LED 30a position to a corresponding visual marker position in a graphical user interface 18. Acquired digital image frames are converted to digital data by an imaging device 12 sensor, and analyzed to determine regions of increased color intensity corresponding to a position of the middle blue LED 30a in the image frame. The data may be subjected to one or more filtering steps to remove areas of lesser color intensity, and to remove areas displaying a color that is other than the predetermined blue color of middle LED 30a. Data representative of a location of the middle LED 30a are scaled in a non-linear fashion to render a visual marker such as a cursor on the graphical user interface 18, corresponding to a calculated position and/or motion of the middle LED 30*a* moved in three-dimensional space.

The use of the pointing/input device 14 for left click, right click, drag, etc. operations will now be described. For a left click operation, actuating left button 26 of pointing/input device 14 actuates left switch 42 which in turn actuates a left LED 32*b* of the second set of visible point light sources 32, which as noted above in the depicted embodiment emits a red light. The left LED 32*b* will remain in an "on" status as long as the left button 26 is not released. Therefore, by processing the corresponding images including an activated blue middle LED 30*a* and an activated red left LED 32*b*, the pointing computer programs interpret the combination of activated point light sources and the length of time of activation of left LED 32*b* as a left click command, a double click command, or a drag command. Right click functions are performed and processed similarly, except that operator O actuates right button 24 to activate right (red) LED 32*a*.

It will be appreciated that the two red LEDs 32*a*, 32*b* are not activated simultaneously, therefore the software differentiates left click and right click commands by the position (in a captured image) of the activated red LED relative to the middle blue LED 30*a*. Thus, activation of the left-side (relative to the middle blue LED 30*a*) red LED 32*b* is interpreted as a left click command, and activation of the right side LED 32*a* is interpreted as a right click command. To execute a double click command, it is required only to detect a "click," i.e. a separate event of activating a point light source, twice within a constant predetermined time period, for example 100 ms. The following actions are interpreted as a drag command: (a) activate left (red) LED 32*a*; (b) track the activated left (red) LED 32*a*; and (c) inactivate left (red) LED 32*a*. The process of tracking an activated red point light source is substantially as described supra for tracking the middle blue LED 30*a*. Hence, all familiar pointing functions of a computer mouse can be performed by the pointing/input device 14 in 2D mode except these functions are performed in the air, instead of requiring a surface over which the device 14 is translated.

Figure 5:
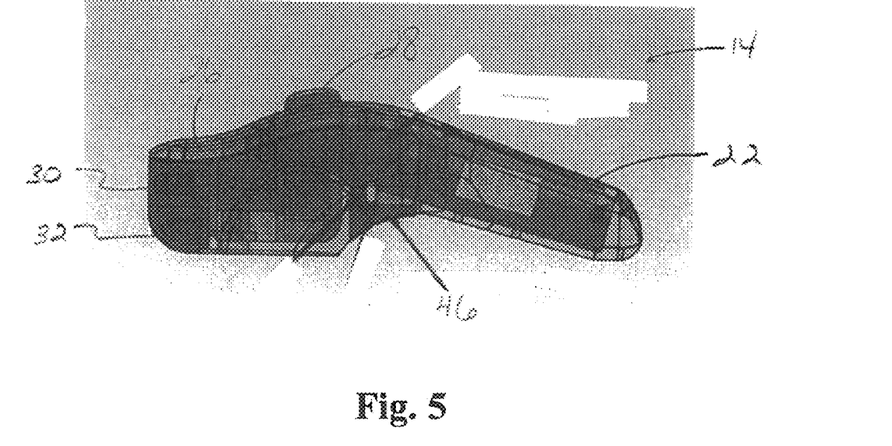
FIG. 5 shows a side view of the pointing/input device of FIG. 4.
Figure 8:
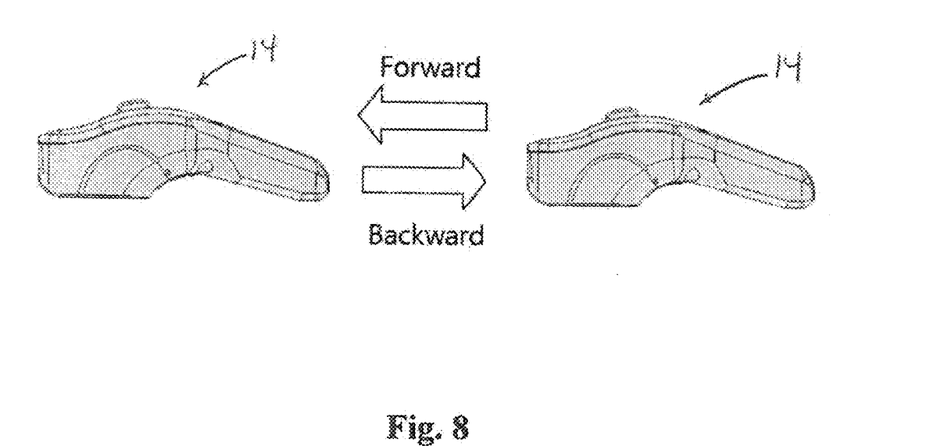
FIG. 8 shows the pointing/input device according to the present disclosure, being translated forward and backward for pointing/command input in 3D mode.
Figure 9:
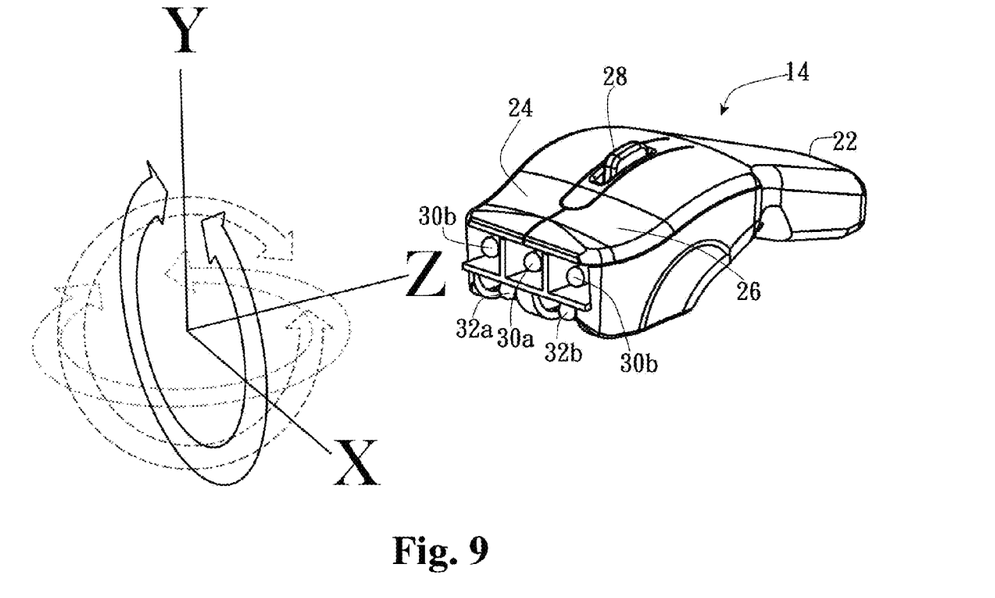
FIG. 9 shows the pointing/input device according to the present disclosure, being rotated in 3D space for pointing/command input in 3D mode.

For operation of the pointing/input device in 3D mode, in the depicted embodiment operator O actuates a 3D button 46 which in turn actuates switch 40 (see FIGS. 5-6). This in turn activates the left and right LEDs 30*b* of the first set of visible point light sources 30, which in the depicted embodiment emit light having a blue color. Since the middle LED 30*a* was previously activated to effect 2D pointing as described above, it will be appreciated that all the visible point light sources of the first set 30 of visible point light sources are now activated. The computer program products of the system 10 can now analyze sequential image frames captured and converted to digital data by the imaging device 12 to compute a 3D depth of the pointing/input device 14 and from that information also an angle of the pointing device (with respect to an xz-plane) in each captured image frame. Therefore, by moving the pointing device forward and backward along a z-axis (see arrows in FIG. 8), or by rotating the pointing device about the z-axis (see FIG. 9), information regarding the depth and angle of the pointing/input device 14 can be input to the computing device 16 and interpreted to control, for instance, the dimension of a window or a drawing, or the orientation of an object or a photo, as rendered on a graphical user interface 18. The process of computing a 3D depth and/or angle of pointing/input device 14 including aligned point light sources is described in detail below.

When in 3D mode, drag commands are interpreted differently from those described above for the pointing/input device 14 in 2D mode. A left click and/or drag is still performed by pushing and holding the left button 26 of the pointing/input device 14. As summarized above, operator O actuates left switch 42 which in turn actuates a left red LED 32*b* of the second set of visible point light sources 32, which is then seen by the imaging device 12. However, instead of moving the window or object pointed to by the cursor to a new location as described for the pointing/input device 14 in 2D mode, in 3D mode this action causes the computer program to change the dimension of the window or the drawing pointed to by the cursor based on a calculated depth of the left red LED 32*b* of the pointing/input device 14, until the left button 26 is released. Similarly, by pushing and holding the right button 24 to actuate right red LED 32*a*, the computer program uses a calculated angle of the right red LED 32*a* of the pointing/input device 14 to change the orientation of an object or a photo rendered on a graphical user interface 18.

Figure 10:
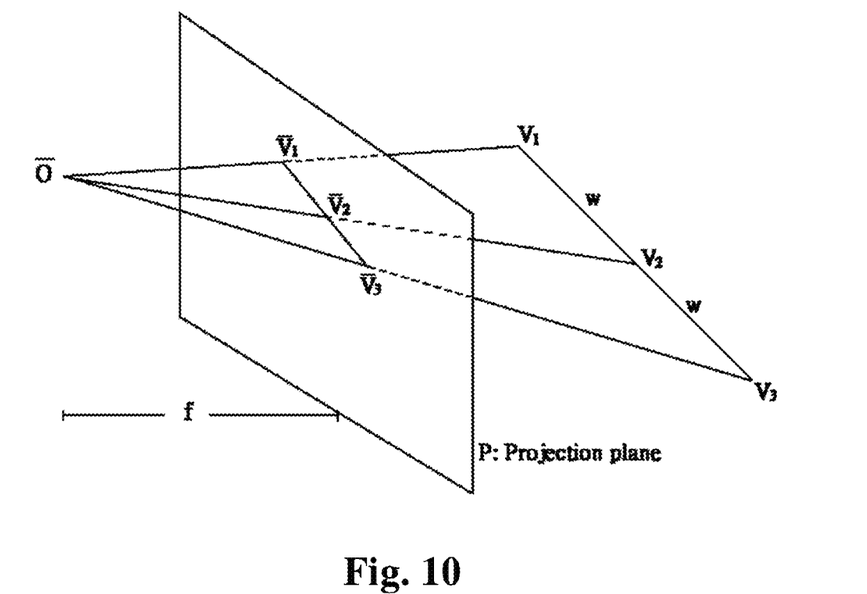
FIG. 10 graphically depicts a perspective view of a projection of three aligned vertices $V_1 V_2 V_3$ on a projection plane P ($\nabla_1$, $\nabla_2$ and $\nabla_3$), used to calculate a position and/or orientation of the pointing/input device of FIG. 4.

Exemplary calculations used by the one or more computer program products for using captured images showing the variously actuated point light sources of the first and second sets 30, 32 of visible point light sources will now be described. For this process, one assumption is that a pinhole of the imaging device 12 ($\overline{O}$) is the center of perspective projection (see FIG. 10); P, a sensor plane of the imaging device 12, is the projection plane; $V_i=(X_i, Y_i, Z_i)$, i=1, 2, 3, are the to-be-determined coordinates of the three aligned blue LED lights 30*a*, 30*b* in 3D; $\overline{V}_i=(x_i, y_i, z_i)$, i=1, 2, 3, are the known projections of $V_i=(X_i, Y_i, Z_i)$, i=1, 2, 3, on the projection plane. The computation process is shown below.

Certain variables in the calculations are as follows:

Given:

$\overline{O}=(0, 0, 0)$: center of projection $V_1V_2V_3$: three aligned vertices $V_i=(x_i, y_i, z_i)$, i=1, 2, 3, with $V_2$ being the midpoint of $V_1$ and $V_3$, and the distance between $V_1$ and $V_2$ is w. $V_1V_2V_3$ is not perpendicular to the projection plane P.

P: projection plane. The distance between $\overline{O}$ and P is f. Here we assume $\overline{O}$ is the origin of a three-dimensional coordinate system and the projection plane is perpendicular to the z-axis of the coordinate system at the point (0, 0, −f).

$\overline{V}_i$: projection of $V_i$ on the projection plane P; $\overline{V}_i=(\overline{x}_i, \overline{y}_i, -f)$ To calculate $V_i$ from $\overline{V}_i$, i=1, 2, 3 (see FIG. 10 for an illustration of the given condition), the assumption that $V_1V_2V_3$ is not perpendicular to the projection plane P means that $\overline{V}_1, \overline{V}_2$ and $\overline{V}_3$ are not coinciding, i.e., $\overline{V}_1 \neq \overline{V}_2 \neq \overline{V}_3$. Since $\overline{V}_1, \overline{V}_2$ and $\overline{V}_3$ are known, the distance between $\overline{V}_1$ and $\overline{V}_2$, and the distance between $\overline{V}_2$ and $\overline{V}_3$ can be computed. Let $$|\overline{V}_1\overline{V}_2|=p \text{ and } |\overline{V}_2\overline{V}_3|=q$$

Hence, $\overline{V}_2$ can also be expressed as $$\overline{V}_2 = \frac{1}{p+q}(q\overline{V}_1 + p\overline{V}_3) \quad (1)$$

$$= \frac{1}{p+q}(q\overline{x}_1 + p\overline{x}_3, q\overline{y}_1 + p\overline{y}_3, -(q+p)f)$$

Figure 11:
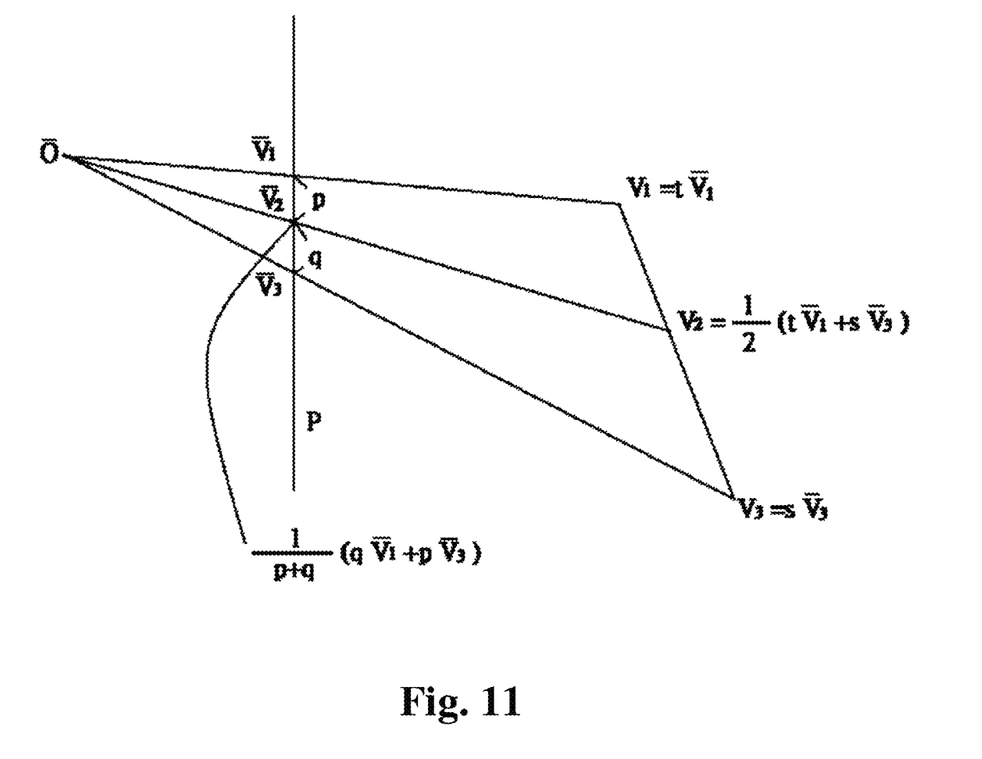
FIG. 11 graphically depicts in side view the FIG. 10 relationship between the aligned vertices $V_1 V_2 V_3$ and the projection of the vertices $V_1 V_2 V_3$ on the projection plane P.

(see FIG. 11).

On the other hand, since $\overline{O}, \overline{V}_1$ and $V_1$ are collinear, and $\overline{O}, V_3$ and $V_3$ are collinear, we have $$V_1 = t \cdot \overline{OV}_1 = t\overline{V}_1 \quad (2)$$

for some t>0, and $$V_3 = s \cdot \overline{OV}_3 = s\overline{V}_3 \quad (3)$$

for some s>0. t and s are to be determined. Hence, as the midpoint of $V_1$ and $V_3$, $V_2$ can also be expressed as $$V_2 = \tfrac{1}{2}(t\overline{V}_1 + s\overline{V}_3) = \tfrac{1}{2}(t\overline{x}_1 + s\overline{x}_3, t\overline{y}_1 + s\overline{y}_3, -(t+S)f) \quad (4)$$

Using the fact that $\overline{OV}_2$ and $\overline{OV}_2$ are vectors in the same direction, we must have $$\frac{t\overline{x}_1 + s\overline{x}_3}{q\overline{x}_1 + p\overline{x}_3} = \frac{t\overline{y}_1 + s\overline{y}_3}{q\overline{y}_1 + p\overline{y}_3} = \frac{(t+s)f}{(q+p)f}$$

or $$\begin{cases} qs(\overline{x}_1 - \overline{x}_3) = pt(\overline{x}_1 - \overline{x}_3) \\ qs(\overline{y}_1 - \overline{y}_3) = pt(\overline{y}_1 - \overline{y}_3) \end{cases}$$

The condition that $\nabla_1 \neq \nabla_2 \neq \nabla_3$ implies that $\overline{x}_1 - \overline{x}_3$ and $\overline{y}_1 - \overline{y}_3$ cannot be zero simultaneously. Hence, we have $$qs = pt \quad (5)$$

or $$\frac{s}{t} = \frac{p}{q}$$

(5) is an important result. From (5), s can be expressed as $$s = pt/q \quad (6)$$

Substituting (6) into (3) for s and using the fact that $V_1V_3$ is a line segment of length 2w, we have $$t^2\left(\overline{x}_1 - \frac{p}{q}\overline{x}_3\right)^2 + t^2\left(\overline{y}_1 - \frac{p}{q}\overline{y}_3\right)^2 + t^2\left(f - \frac{p}{q}f\right)^2 = 4w^2$$

Solving this equation for t, we get $$t = 2w \Big/ \sqrt{\left(\overline{x}_1 - \frac{p}{q}\overline{x}_3\right)^2 + \left(\overline{y}_1 - \frac{p}{q}\overline{y}_3\right)^2 + \left(f - \frac{p}{q}f\right)^2} \quad (7)$$

By substituting (7) into (6), we get $$s = 2w \Big/ \sqrt{\left(\frac{q}{p}\overline{x}_1 - \overline{x}_3\right)^2 + \left(\frac{q}{p}\overline{y}_1 - \overline{y}_3\right)^2 + \left(\frac{q}{p}f - f\right)^2} \quad (8)$$

Hence, using (7) for t in (2) and (8) for s in (3), we get $V_1$ and $V_3$. As the midpoint of $V_1$ and $V_3$, $V_2$ can be computed using (4). After acquiring the coordinates of the three aligned blue LED lights 30a, 30b as explained above, a vector in 3D mode can be calculated by using the formula $V_3 - V_1 = \langle X_3 - X_1, Y_3 - Y_1, Z_3 - Z_1 \rangle$. Therefore, the orientation or angle of the pointing/input device 14 can be defined as the angle between the vector $V_3 - V_1$ and the positive x-axis, and calculated from the above information.

Thus, by use of digital data rendered from captured images including the activated aligned point light sources of first point light source 30, a depth of each point light source and so a depth and/or orientation of pointing/input device 14 in 3D space may be calculated as described and rendered as a cursor on a graphical user interface 18. In turn, the relative depths of each of the point light sources of aligned point light source set 30 are used to determine an orientation or angle of the pointing/input device 14 in 3D space. Those calculated depths/orientations are then interpreted as particular pointing or command inputs of the pointing/input device 14 as described, and rendered on a graphical user interface 18 of a computing device 16.

Summarizing, the present disclosure provides a pointing/input system including an input or pointing device 14 which allows pointing and command input in 2D and 3D mode, without requiring a direct connection to a computing device 16 or a surface over which pointing/input device 14 must be translated. All standard functions of the pointing/input device 14 such as left click, right click, drag and drop, etc. are performed using buttons and actions corresponding to those with which a user of a conventional computer mouse is familiar. The pointing/input device 14 is inexpensive and simple, requiring only sets of aligned visible point light sources and simple circuitry. Advantageously, the disclosed system 10 is likewise economical, simple, and likely already available in many homes but for the pointing/input device 14 and software. But for the pointing/input device 14 and software, for additional hardware the system 10 requires only a computing device 16 and a conventional imaging device 12 such as a standard webcam, and having no requirement for any specific wired or wireless connection (such as wiring or cabling, or a specialized IR or other signal) between the pointing/input device 14 and the imaging device 12. Exemplary advantages of the disclosed system include allowing an operator to point and/or input gesture commands to a computing device, a "smart" television, and the like in either 2D or 3D mode, transitioning between these modes by simple switch actuations. Still further, the system of the present disclosure can be readily retrofitted to existing computing devices as long as the devices support operation of an integrated or peripheral imaging device such as a webcam.

One of ordinary skill in the art will recognize that additional embodiments of the invention are also possible without departing from the teachings herein. Thus, the foregoing description is presented for purposes of illustration and description of the various aspects of the invention, and one of ordinary skill in the art will recognize that additional embodiments of the invention are possible without departing from the teachings herein. This detailed description, and particularly the specific details of the exemplary embodiments, is given primarily for clarity of understanding, and no unnecessary limitations are to be imported, for modifications will become obvious to those skilled in the art upon reading this disclosure and may be made without departing from the spirit or scope of the invention. Relatively apparent modifications, of course, include combining the various features of one or more figures with the features of one or more of other figures. All such modifications and variations are within the scope of the invention as determined by the appended claims when interpreted in accordance with the breadth to which they are fairly, legally and equitably entitled.

What is claimed is:

1. A computing system for tracking a motion and/or an orientation of a pointing/input device, comprising:
    a computing device having at least one processor, at least one memory, and at least one graphical user interface;
    at least one pointing/input device including a first set of aligned visible point light sources emitting light of a wavelength defining a first predetermined color and a second set of visible point light sources emitting light of a wavelength that defines a second predetermined color that is different from the first predetermined color;
    an imaging device operably linked to the computing device and configured for capturing a plurality of sequential image frames; and at least one computer program product operable on the computing device processor, the at least one computer program product including executable instructions for determining at least a position and/or a motion and/or an orientation of the at least one pointing/input device from digital data of the plurality of sequential image frames providing views of the first and second sets of visible point light sources held and/or moved in a three-dimensional space within a field of view of the imaging device, and for rendering on the graphical user interface a visual marker corresponding to the determined position and/or the motion and/or the orientation of the at least one pointing/input device.

2. The system of claim 1, wherein the imaging device is a single lens web cam.

3. The system of claim 1, wherein the at least one computer program product includes executable instructions for mapping and displaying in the graphical user interface a two-dimensional position and/or motion of the at least one pointing/input device within the field of view of the imaging device, comprising:
determining a position of a single actuated point light source of the first set of visible point light sources in each of said plurality of sequential image frames by filtering one or more regions of said plurality of sequential image frames to isolate areas having a predetermined color of the single actuated point light source;
converting the determined position of the single point light source into a position of the visual marker in the graphical user interface; and
displaying the visual marker in the graphical user interface.

4. The system of claim 1, further including mapping an actuation pattern of the first and second sets of visible point light sources to a predetermined pointing and/or input command.

5. The system of claim 1, wherein the at least one computer program product includes executable instructions for mapping and displaying in the graphical user interface a three-dimensional position and/or motion of the at least one pointing/input device, comprising:
determining a three-dimensional coordinate of each visible point light source of the actuated first set of aligned visible point light sources in each of said plurality of sequential image frames;
converting the determined three-dimensional coordinate into a three-dimensional position of the visual marker in the graphical user interface; and
displaying the three-dimensional position of the visual marker in the graphical user interface.

6. The system of claim 5, wherein the at least one computer program product includes executable instructions for determining the three-dimensional coordinate in each of said plurality of sequential image frames by:
calculating a depth of each visible point light source of the actuated first set of aligned visible point light sources with respect to a pre-determined origin of a three-dimensional coordinate system;
calculating an angle of a light beam emitted by each visible point light source of the actuated first set of visible point light sources with respect to a projection plane defining a plane perpendicular to a z-axis of the three-dimensional coordinate system; and
determining a three-dimensional coordinate and orientation of the at least one pointing/input device from said calculated depth and angle.

7. The system of claim 5, further including mapping an actuation pattern of the first and second sets of visible point light sources to a predetermined pointing and/or input command.

8. In a computing system environment, a method for two-dimensional and three-dimensional pointing and/or command input, comprising:
providing at least one pointing/input device including a first set of aligned visible point light sources emitting light of a wavelength defining a first predetermined color and a second set of visible point light sources emitting light of a wavelength defining a second predetermined color that is different from the first predetermined color;
holding and/or moving the at least one pointing/input device in a three-dimensional space disposed within a field of view of an imaging device operably connected to a computing device having at least one processor, at least one memory, and at least one graphical user interface;
by the imaging device, capturing a plurality of sequential image frames each including a view of the at least one pointing/input device, the at least one pointing/input device having at least a portion of the first and second sets of visible point light sources activated to emit light;
from one or more views of at least one of the first set of aligned visible point light sources and the second set of visible point light sources in the captured plurality of sequential image frames, calculating a two-dimensional or a three-dimensional position and/or motion and/or orientation of the at least one pointing/input device; and
rendering a visual marker on the graphical user interface corresponding to the calculated position and/or motion and/or orientation of the at least one pointing/input device.

9. The method of claim 8, further including mapping an actuation pattern of the first and second sets of visible point light sources to a predetermined pointing and/or input command.

10. The method of claim 8, including the steps of:
determining a position of a single actuated point light source of the first set of aligned visible point light sources in each of said plurality of sequential image frames by filtering one or more regions of said plurality of sequential image frames to isolate areas having a predetermined color of the single actuated point light source;
converting the determined position of the single point light source into a position of the visual marker in the graphical user interface; and
displaying the visual marker in the graphical user interface to map and display a two-dimensional position and/or motion of the at least one pointing/input device.

11. The method of claim 8, including mapping and displaying in the graphical user interface a three-dimensional position and/or motion and/or orientation of the at least one pointing/input device, comprising:
determining a three-dimensional coordinate of each visible point light source of the actuated first set of aligned visible point light sources in each of said plurality of sequential image frames;
converting the determined three-dimensional coordinate into a three-dimensional position of the visual marker in the graphical user interface; and
displaying the three-dimensional position of the visual marker in the graphical user interface.

12. The method of claim 11, further including determining the three-dimensional coordinate by:

calculating a depth of each visible point light source of the actuated first set of aligned visible point light sources with respect to a pre-determined origin of a three-dimensional coordinate system;

calculating an angle of a light beam emitted by each visible point light source of the actuated first set of visible point light sources with respect to a projection plane defining a plane perpendicular to a z-axis of the three-dimensional coordinate system; and determining a three-dimensional coordinate and orientation of the at least one pointing/input device from said calculated depth and angle.

* * * * *